(12) United States Patent
Cranston et al.

(10) Patent No.: US 9,327,786 B2
(45) Date of Patent: May 3, 2016

(54) CHAIN GUARD WITH UNITARY BRACKET EXTENSION

(71) Applicant: Eko Sport, Inc., Grand Junction, CO (US)

(72) Inventors: Ryan K. Cranston, Grand Junction, CO (US); Paul J. Aieta, Grand Junction, CO (US); Scott S. Winans, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 106 days.

(21) Appl. No.: 13/967,494

(22) Filed: Aug. 15, 2013

(65) Prior Publication Data

US 2014/0051535 A1 Feb. 20, 2014

Related U.S. Application Data

(60) Provisional application No. 61/684,840, filed on Aug. 20, 2012, provisional application No. 61/684,205, filed on Aug. 17, 2012.

(51) Int. Cl.
| | |
|---|---|
| *B62J 13/00* | (2006.01) |
| *F16D 1/00* | (2006.01) |
| *F16H 57/02* | (2012.01) |
| *F16H 7/20* | (2006.01) |

(52) U.S. Cl.
CPC .. *B62J 13/00* (2013.01); *F16H 7/20* (2013.01)

(58) Field of Classification Search
CPC ............. B62J 13/00; B62J 23/00; F16H 7/18; F16P 1/02; F02B 61/02
USPC ........................................................ 474/144
See application file for complete search history.

(56) References Cited

U.S. PATENT DOCUMENTS

| | | | | |
|---|---|---|---|---|
| 557,181 | A | * | 3/1896 | Billingsley .................... 474/144 |
| 569,394 | A | * | 10/1896 | Thompson .................... 474/144 |
| 582,096 | A | * | 5/1897 | Rominger ..................... 474/144 |
| 655,316 | A | * | 8/1900 | Welch ......................... 280/152.1 |

(Continued)

FOREIGN PATENT DOCUMENTS

| | | |
|---|---|---|
| DE | 2058799 | 11/1970 |
| DE | 3421210 | 12/1984 |

(Continued)

OTHER PUBLICATIONS

"The Goods of Next Season" Photo 12 and Caption; Decline Magazine; Nov./Dec. 2006 Issue; vol. 4, No. 10; H3 Publications, Inc., Valencia, California.

(Continued)

*Primary Examiner* — Henry Liu
(74) *Attorney, Agent, or Firm* — Jason H. Foster; Kremblas & Foster

(57) ABSTRACT

A guard for a chain and chain ring of a bicycle includes a bracket and a bracket extension. The bracket extension has a first end and a second end, and at least the second end is integrally formed. The second end includes a U-shaped configuration configured to house a chain retainer. The bracket and the bracket extension may be secured to one another using two fasteners. The bracket and the bracket extension may rotate relative to one another when only one of the fasteners is attached and may be fixed relative to one another when both of the fasteners are attached.

33 Claims, 14 Drawing Sheets

(56) References Cited

U.S. PATENT DOCUMENTS

| | | | |
|---|---|---|---|
| 671,816 A * | 4/1901 | Cooley | 474/144 |
| 877,820 A * | 1/1908 | Badger | 474/144 |
| 966,391 A * | 8/1910 | Fillingham | 474/144 |
| 968,304 A | 8/1910 | Winslow | |
| 1,296,259 A * | 3/1919 | Bliss | 105/102 |
| 1,325,206 A | 12/1919 | Raybon | |
| 1,400,131 A * | 12/1921 | Adams | 474/144 |
| 1,636,327 A * | 7/1927 | Roe | 474/144 |
| 2,240,998 A * | 5/1941 | Montiglio | 74/413 |
| 2,584,788 A * | 2/1952 | Cich | 474/144 |
| 2,728,244 A | 12/1955 | O'Shei | |
| 3,184,993 A | 5/1965 | Swenson | |
| D208,683 S | 9/1967 | Schreckengost | |
| 3,402,942 A | 9/1968 | Shimano | |
| 3,416,385 A | 12/1968 | Schenk | |
| 3,477,303 A | 11/1969 | Brilando | |
| 3,785,219 A | 1/1974 | Anthamatten | |
| 3,815,439 A | 6/1974 | Tarutani | |
| 3,835,729 A | 9/1974 | Tarutani | |
| 3,869,138 A | 3/1975 | Allison | |
| 3,885,471 A * | 5/1975 | Morine et al. | 474/144 |
| 3,910,136 A | 10/1975 | Juy | |
| 3,973,447 A | 8/1976 | Nagano | |
| 4,044,621 A | 8/1977 | McGregor, Sr. | |
| 4,078,444 A | 3/1978 | Huret | |
| 4,106,357 A | 8/1978 | Segawa | |
| 4,135,727 A | 1/1979 | Campagnolo | |
| 4,178,062 A | 12/1979 | Abbo | |
| 4,237,743 A | 12/1980 | Nagano | |
| 4,240,303 A * | 12/1980 | Mosley | 474/144 |
| 4,330,137 A | 5/1982 | Nagano | |
| 4,337,933 A | 7/1982 | Egami | |
| 4,380,445 A | 4/1983 | Shimano | |
| 4,433,963 A | 2/1984 | Shimano | |
| 4,439,172 A | 3/1984 | Segawa | |
| 4,471,851 A | 9/1984 | Kamiya et al. | |
| 4,475,894 A | 10/1984 | Sugino | |
| 4,487,424 A | 12/1984 | Ellis | |
| 4,498,890 A | 2/1985 | Sutherland | |
| 4,507,105 A * | 3/1985 | Stottmann et al. | 474/144 |
| 4,515,386 A * | 5/1985 | Tsujimura | 280/304.3 |
| 4,573,950 A | 3/1986 | Nagano | |
| 4,632,416 A | 12/1986 | Zelenetz | |
| 4,639,240 A * | 1/1987 | Liu | 474/144 |
| 4,648,855 A * | 3/1987 | Palloch et al. | 474/144 |
| 4,662,862 A | 5/1987 | Matson | |
| 4,754,833 A * | 7/1988 | Kawashima | 180/219 |
| D298,613 S | 11/1988 | McMurtrey | |
| 4,832,667 A | 5/1989 | Wren | |
| 4,854,924 A | 8/1989 | Nagano | |
| 4,905,541 A | 3/1990 | Alan | |
| 4,946,426 A | 8/1990 | Leonard | |
| 5,002,520 A | 3/1991 | Greenlaw | |
| 5,003,840 A | 4/1991 | Hinschlager | |
| 5,018,564 A | 5/1991 | Anglin | |
| 5,067,930 A * | 11/1991 | Morales | 474/144 |
| D323,309 S | 1/1992 | Perry | |
| 5,134,901 A | 8/1992 | Grady | |
| 5,320,582 A | 6/1994 | Takeda | |
| 5,320,583 A | 6/1994 | van Wingen born Looyen | |
| 5,326,331 A | 7/1994 | Hallock, III | |
| D355,872 S | 2/1995 | Haney et al. | |
| 5,460,576 A * | 10/1995 | Barnett | 474/144 |
| 5,496,222 A | 3/1996 | Kojima et al. | |
| 5,540,118 A | 7/1996 | Calendrille, Jr. | |
| 5,620,384 A | 4/1997 | Kojima et al. | |
| 5,676,616 A | 10/1997 | Hara | |
| 5,679,084 A | 10/1997 | Daniels, III | |
| 5,725,450 A * | 3/1998 | Huskey | 474/116 |
| 5,728,018 A | 3/1998 | Terada et al. | |
| 5,782,714 A | 7/1998 | Osgood | |
| 5,846,148 A | 12/1998 | Fujii | |
| 6,039,665 A | 3/2000 | Nakamura | |
| 6,083,132 A | 7/2000 | Walker | |
| 6,117,032 A | 9/2000 | Nankou | |
| 6,165,092 A * | 12/2000 | Bramham et al. | 474/134 |
| 6,190,275 B1 | 2/2001 | Ciancio et al. | |
| 6,203,459 B1 | 3/2001 | Calendrille, Jr. | |
| 6,332,853 B1 | 12/2001 | Bowman | |
| 6,354,973 B1 * | 3/2002 | Barnett | 474/140 |
| 6,416,434 B1 | 7/2002 | Calendrille, Jr. | |
| 6,533,690 B2 | 3/2003 | Barnett | |
| 6,988,427 B2 | 1/2006 | Yamanaka | |
| 7,059,983 B2 | 6/2006 | Heim | |
| 7,066,856 B1 * | 6/2006 | Rogers | 474/144 |
| 7,066,857 B1 * | 6/2006 | DeRosa | 474/144 |
| 7,244,203 B2 * | 7/2007 | Sze et al. | 474/82 |
| RE42,436 E * | 6/2011 | Rogers | 474/144 |
| 8,235,849 B2 * | 8/2012 | Cranston et al. | 474/144 |
| RE44,379 E * | 7/2013 | Rogers | 474/144 |
| 8,491,429 B2 | 7/2013 | Cranston et al. | |
| 8,561,750 B2 * | 10/2013 | Kakimoto et al. | 180/357 |
| 2002/0042316 A1 * | 4/2002 | Young et al. | 474/140 |
| 2002/0160869 A1 * | 10/2002 | Barnett | 474/144 |
| 2003/0224891 A1 * | 12/2003 | Chou | 474/146 |
| 2004/0009835 A1 | 1/2004 | Heim | |
| 2004/0254038 A1 | 12/2004 | Chamberlain | |
| 2005/0159260 A1 * | 7/2005 | Gogo | 474/111 |
| 2006/0058139 A1 * | 3/2006 | Fry | 474/144 |
| 2006/0199690 A1 * | 9/2006 | Gardner et al. | 474/144 |
| 2007/0032324 A1 * | 2/2007 | Uchiyama et al. | 474/140 |
| 2007/0235986 A1 | 10/2007 | Weagle | |
| 2007/0265121 A1 * | 11/2007 | Gross | 474/144 |
| 2008/0227573 A1 * | 9/2008 | Strombeck et al. | 474/144 |
| 2008/0293528 A1 * | 11/2008 | Paull | 474/144 |
| 2009/0062049 A1 * | 3/2009 | Cranston et al. | 474/144 |

FOREIGN PATENT DOCUMENTS

| | | |
|---|---|---|
| DE | 3417336 | 11/1985 |
| DE | 3537615 | 4/1987 |
| DE | 4126156 | 3/1992 |
| DK | 96297 | 7/1939 |
| EP | 1288119 | 3/2003 |
| JP | 11020764 | 1/1999 |
| NE | 9300333 | 9/1994 |
| NL | 7800724 | 7/1979 |
| SU | 1199696 | 12/1985 |

OTHER PUBLICATIONS

Office Action mailed on Aug. 27, 2012, in a co-pending U.S. Appl. No. 13/153,967, filed Jun. 6, 2011.

Response to the Office Action of Aug. 27, 2012, filed on Dec. 21, 2012, in co-pending U.S. Appl. No. 13/153,967.

Response to the Office Action of Oct. 3, 2012, filed on Jan. 3, 2013, in co-pending U.S. Appl. No. 12/017,425.

Mountain Cycle Catalog 2000; www.MountainCycle.com; published as of Aug. 2000.

Mountain Bike Action Magazine; Oct. 2000; pp. 38-40; www.mbaction.com.

Mountain Cycle Shockware—Photos of products on sale in U.S. as of Aug. 2000.

Mountain Bike Action Magazine 2000, p. 138, www.mbaction.com, published as of Aug. 2000.

Mountain Cycle Universal Chainguide Instructions, www.mountaincycle.com, published as of Aug. 2000.

2001 Gizmo Installation Instructions, web.archive.org/web/20011025172447/http://mrdirt.com/gizmo/page4.htm; Jan. 2001.

Mr. Dirt Gizmo Pictures of products on sale in U.S. as of Oct. 2001.

2006 Race Face Interbike (Trade Show) Booth, www.bikemagic.com; photo of product on sale in U.S. as of Sep. 27, 2006.

Raceface Diabolus Chainguide Instructions, published as of Sep. 2006.

Decline Magazine, Jan.-Feb. 2006, Issue 20, Article "Its the New Style".

Diabolus Chainguide actual Product Photos of product on sale in U.S. as of Sep. 2006.

Prosecution history for U.S. Appl. No. 13/153,967, filed Jun. 6, 2011; Inventor: James K. Rogers.

* cited by examiner

CHAIN GUARD WITH UNITARY BRACKET EXTENSION

CROSS-REFERENCES TO RELATED APPLICATIONS

This application claims the benefit of U.S. Provisional Application No. 61/684,840 filed Aug. 20, 2012 and U.S. Provisional Application No. 61/684,205 filed Aug. 17, 2012.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present invention relates to a chain guard for use on a bicycle. More specifically, the present invention relates to a chain guard that has a bracket and a bracket extension that may be capable of rotating relative to one another and where the extension may be formed of a unitary piece.

Many people enjoy riding bicycles. Some children and families confine their use of bicycles to improved, paved areas and streets. Others enjoy racing bicycles in various peloton events. However, some people enjoy riding bicycles off-road, often in rugged terrain.

When a bicycle is ridden off-road, a rider may encounter rocks, ruts, tree stumps, and other obstacles, both natural and man-made. Bicycles designed for such riding may include parts and features to improve ride performance as well as to protect both rider and bicycle from these obstacles.

In some cases, the designs of various parts of the bicycle are modified to accommodate these items. For example, in order to better distribute shock and minimize the risk of puncture, the tire may be widened from the standard narrow tire for a road bike. In other examples, shock absorbers can be modified to include springs (or the equivalent) with an increased spring constant and longer path of travel. These modifications at least partially compensate for the additional strain placed on the bicycle and the rider.

In some examples, it may be desirable to include features that reduce or minimize the risk that a part of the bicycle would be damaged by ambient objects. Among the bicycle parts most likely to contact ambient objects are the chain and the chain rings. These chain rings, and the chain that surrounds them, are particularly vulnerable. There is little protective structure that is typically placed in front of or near these components. Accordingly, once the front wheel has, for example, passed over an obstacle and returned to the ground on the other side, the obstacle may come into contact with the chain ring and chain.

What is desirable is for some sort of guard to be included that serves as a barrier to at least some of the potential impacts of obstacles against the chain ring and chain. One example of a known design is shown in commonly owned U.S. Reissued Pat. No. Re. 42,436. While such a design may achieve some of the desired purposes of a chain ring guard, there are other features that may be deemed desirable that could be included.

The present design improves on the prior design in a number of ways. For example, the design disclosed herein includes a U-shaped end that is integrally formed with the bracket extension that extends below the chain ring. This U-shaped end may be configured to allow a pulley or other chain retainer to be installed. The retainer may be slidably installed to further protect the rider from injury by maintaining the chain in contact with the chain ring.

Further, the bracket extension disclosed herein may be rotatably attached to the bracket. This rotatable attachment may aid a user in assembling the structure onto a bicycle.

In addition, the rotation feature may allow for greater ease of replacement.

These and other features and combinations of these and other features may be important to a user and further reduce the user's risk of injury when riding a bicycle in an off-road context.

BRIEF SUMMARY OF THE INVENTION

According to one embodiment, a guard for protecting a chain and chain ring of a bicycle includes a bracket and a bracket extension. The bracket may be capable of being secured to the frame of a bicycle and may define at least a first bracket aperture and a second bracket aperture. The first bracket aperture may be configured to receive a crank axle of the bicycle. The bracket extension may have a first end and a second end and may be removably and rotatably secured to the bracket. The bracket extension may be made of a continuous unitary piece and may define at least a first bracket extension aperture.

The first bracket extension aperture and the second bracket aperture may correspond to one another and form a first corresponding set of apertures, such that when the first corresponding set of apertures are placed adjacent one another, the first corresponding set of apertures is configured to allow a fastener to pass through the first corresponding set of apertures and thereby restrict the bracket and the bracket extension from rotating relative to one another.

The second end of said bracket extension may have an integrally formed U-shaped configuration, which may be capable of substantially housing at least one bike chain retainer. The bike chain retainer may substantially fit within the U-shaped configuration.

The bracket may define a third bracket aperture and the bracket extension may define a second bracket extension aperture. The second bracket extension aperture and the third bracket aperture may correspond to one another and form a corresponding second set of apertures, such that when the second corresponding set of apertures are placed adjacent one another, the second corresponding set of apertures is configured to allow a second fastener to pass through the second corresponding set of apertures and thereby allow the bracket and the bracket extension to rotate relative to one another.

The bracket extension may define a recess. The bracket may further define a finger configured to rotatably interfit with the recess in the bracket extension.

The bottom of the U-shaped configuration may be positioned to be between the at least one bike chain retainer and the ground when the guard is secured to a bicycle in operable position. A slot may be defined in at least one leg of the U-shaped configuration and the at least one bike chain retainer may be slidingly secured to the extension with a fastener extending between the at least one bike chain retainer and the slot.

The first bracket extension aperture may be defined in a first finger and a second finger extending from the first bracket extension. The aperture may be an aperture defined in each of the first finger and the second finger. The first finger and the second finger may be configured to be positioned on a respective first side and second side of the bracket adjacent the second bracket aperture to allow a fastener to pass through each adjacent aperture and restrict the relative rotation of the bracket and the bracket extension.

The second bracket extension aperture may be defined in a first finger and a second finger extending from the first bracket extension. The aperture may be an aperture defined in each of the first finger and the second finger. The first finger and second finger may be configured to be positioned on a respective first side and second side of the bracket adjacent the third bracket aperture to allow a fastener to pass through each adjacent aperture and permit the relative rotation of the bracket and the bracket extension.

The at least one bike chain retainer may be a rotatable pulley. The fastener extending between the slot and the at least one bike chain retainer may include an axle about which the pulley is configured to rotate. Alternatively, the at least one bike chain retainer may be a slide. The slot in which the at least one bike chain retainer may be configured to slide may be positioned adjacent a free end of each leg of the U-shaped second end. The bottom of the U-shaped second end may be at least as long as the at least one bike chain retainer.

In another embodiment, a guard for protecting a chain and chain ring of a bicycle includes a bracket and a bracket extension. The bracket may be configured to be secured to the frame of a bicycle. The bracket may define at least one aperture of a shape and size to receive a crank axle of a bicycle. The bracket extension may be secured to the bracket. The bracket extension may have a first end and a second end. The second end may include a portion having a U-shaped configuration. The U-shaped configuration may be capable of housing at least one bike chain retainer. The U-shaped configuration may include at least a first leg and a second leg. The second end may further extend away from the first leg and the second leg. The second end may be integrally formed.

The bottom of the U-shaped configuration may be positioned to be between the at least one bike chain retainer and the ground when the guard is secured to a bicycle. A slot may be defined in at least one of the first leg and the second leg of the U-shaped configuration. The at least one retainer may be slidingly secured to the extension with a fastener extending between the at least one bike chain retainer and the slot.

The at least one bike chain retainer may be a rotatable pulley. The fastener extending between the slot and the retainer may include an axle about which the pulley is configured to rotate. The at least one bike chain retainer may include a slide. The slot may be positioned adjacent a free end of each leg of the U-shaped second end. The bottom of the U-shaped second end may be at least as long as the at least one bike chain retainer.

The at least one bike chain retainer may be slidable. The at least one bike chain retainer may be slidable within the second end of the bracket extension. The at least one bike chain retainer may be adjustable by sliding the first end of the bracket extension relative to the second end of the bracket extension. The bracket extension may be formed integrally.

In another embodiment, a guard for protecting a chain and chain ring of a bicycle includes a bracket and a bracket extension. The bracket may be configured to be secured to a bicycle frame in at least partially surrounding relation to a bicycle crank axle. The bracket extension may be configured to be removably secured to the bracket in at least a first location and a second location. The bracket and the bracket extension may be removably secured at the first location in a manner that permits the bracket and the bracket extension to rotate relative to one another when the bracket and the bracket extension are removably secured at only the first location. The bracket and the bracket extension may be removably secured at the second location in a manner that prevents the bracket and the bracket extension from rotating relative to one another when the bracket and the bracket extension are removably secured at both the first and the second location. The bracket and the bracket extension may be removably secured at the second location by a fastener that includes a first part and a second part. Only one of the first part and the second part may be capable of being manipulated to secure the bracket and the bracket extension to one another.

The manipulable part of the fastener may be positioned on an inboard side of the bracket. The manipulable part of the fastener may be positioned on an outboard side of the bracket. A chain retainer may be secured to the bracket extension. The chain retainer may be slidably adjustable relative to the bracket. The chain retainer may be positioned within a cavity formed between a first leg and a second leg of a retainer holder. The first leg and the second leg may be integrally formed together.

Figure 1:
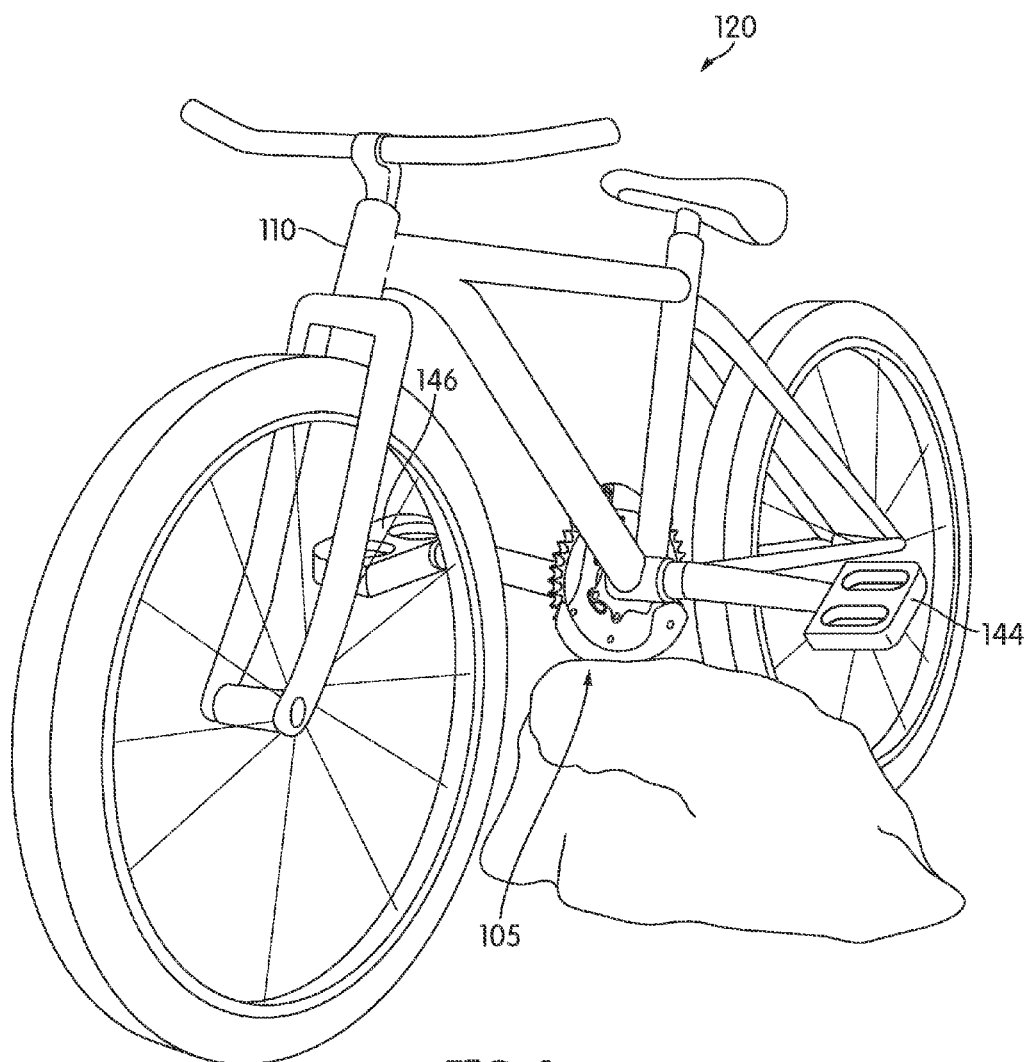
FIG. 1 is a perspective view of one embodiment of a guard according to the present disclosure in use on a bicycle.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground (see FIG. 1), the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between a vertical plane substantially bisecting the bicycle ("centerplane") and an item spaced from the centerplane. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

In the present disclosure, there are some embodiments disclosed, illustrated, or described that may be used interchangeably with other embodiments. For example, in FIGS. 17-20, one configuration of a guard is disclosed. This configuration may be used with any of the attachment configurations, such as that shown in FIG. 3 or FIG. 16. A person having ordinary skill in the art is able to select the sub parts of the guard that are desirable in a particular application from those described herein.

The present disclosure relates to a guard or bracket extension 105 that may be used to protect a bicycle chain or a chain ring from damage due to impact with other objects. While the disclosure describes the use of this guard 105 in connection with a bicycle having two wheels, propelled by human action, and being used near a bicycle crank axle, the guard 105 could be used in connection with other types of vehicles and in other places. For example, the guard 105 could be used on a vehicle that uses a belt-drive system instead of a chain-drive system. The guard 105 could be placed adjacent an axle of a bicycle or another rotating part. The guard 105 could be used in connection with a tricycle or vehicle having a different number of wheels. All of these vehicles are considered to be "bicycles" for purposes of the present disclosure.

U.S. Provisional Application No. 61/684,840 filed Aug. 20, 2012 and U.S. Provisional Application No. 61/684,205 filed Aug. 17, 2012 are incorporated herein by reference.

Referring to the FIGS. generally, the present disclosure relates to a guard 105 that may include two primary parts, a bracket 100 and bracket extension 150. In the illustrated embodiments, the bracket 100 and the bracket extension 150 may be removably secured to one another in at least a first location and a second location. When the bracket 100 and the bracket extension 150 are removably secured to one another in only the first location, the bracket 100 and the bracket extension 150 are permitted to or may rotate or pivot relative to one another. When the bracket 100 and the bracket extension 150 are removably secured to one another in both the first location and the second location, the bracket 100 and the bracket extension 150 are restricted from rotating relative to one another. Each embodiment may demonstrate or implement this rotation and restriction in different manners and with different structures.

Figure 2:
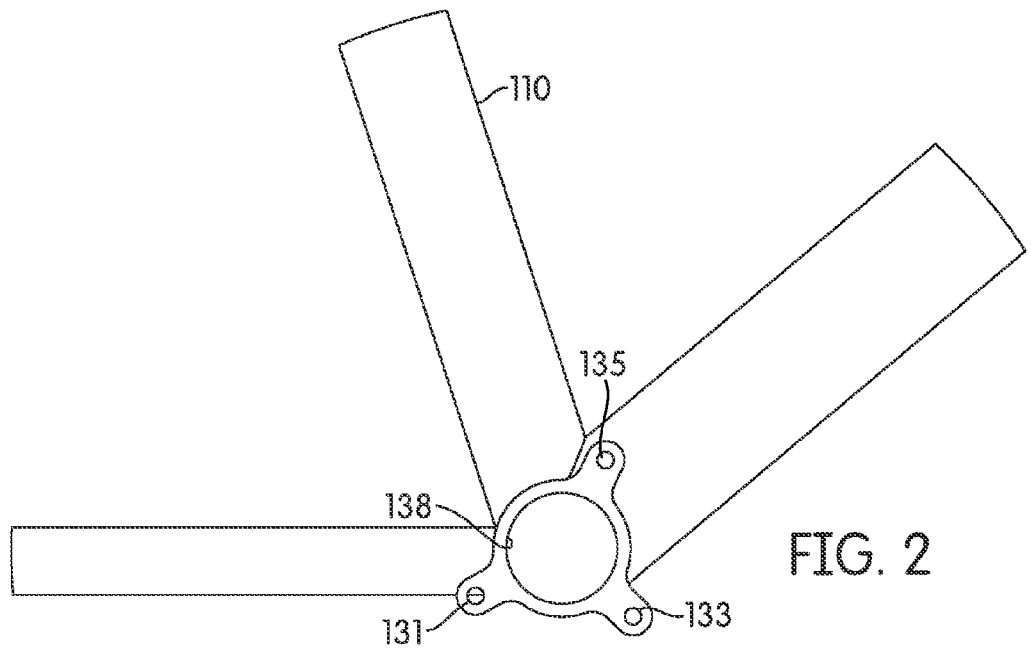
FIG. 2 is a side view of a portion of a bicycle frame.
Figure 3:
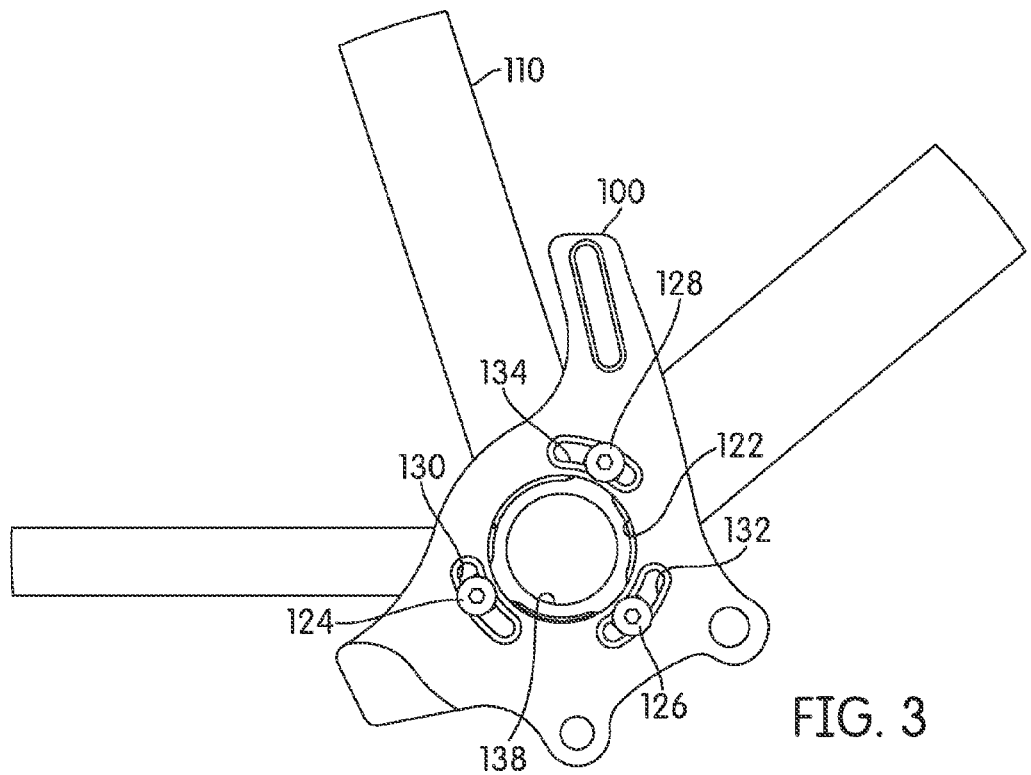
FIG. 3 is a side view of the portion of the bicycle frame of FIG. 2 on which one embodiment of a bracket according to the present disclosure has been installed.

Referring to FIGS. 1-3, in one embodiment, a bracket 100 is attached to a frame 110 of a bicycle 120. In the disclosed embodiments, the bracket 100 is shown as having or defining a first bracket aperture 122. In the disclosed embodiments, the first bracket aperture 122 forms a closed curve. However, such a structure may not be desirable in some embodiments. Depending on the configuration of the frame 110 or bicycle 120, it may instead be desirable for the first bracket aperture 122 to have a U-shaped configuration, where an aperture has an open side. Such a configuration may be desirable to accommodate other features of the bicycle 120, for ease of assembly, for reasons of appearance, cost, or for other reasons that a person having ordinary skill in the art may think important. If a U-shaped configuration is used, the open end of the U could face any direction. When installed on a bicycle, the open end of the U could face upwardly, downwardly, forwardly, rearwardly, or at an angle to any of those directions.

In the illustrated embodiments, the bracket 100 is shown as being attached to a frame 110 of a bicycle 120 in a standard configuration using three fasteners, including a first fastener 124, a second fastener 126, and a third fastener 128. In some embodiments, ISCG tabs (or tabs or other structures positioned according to a different standard than ISCG) may be intermediately mounted to the frame 110 and the bracket 100 may be mounted to the ISCG tabs. Each fastener may fit in an aperture defined in the bracket 100 and an aperture defined in the frame 110, each forming a corresponding set of apertures. Second bracket aperture 130 and first frame aperture 131 correspond to first fastener 124, third bracket aperture 132 and second frame aperture 133 correspond to second fastener 126, and fourth bracket aperture 134 and third frame aperture 135 correspond to third fastener 128. These fasteners 124, 126, 128 may be positioned to be attached to structurally sound areas of the frame 110 to allow a secure attachment between the frame 110 and the bracket 100. In the illustrated embodiments, the fasteners 124, 126, 128 may be bolts. However, any other type of fastener deemed appropriate by a person having ordinary skill in the art may be used. In some cases, screws may be used. While the illustrated embodiments show the use of three fasteners, other numbers of fasteners may be used. For some configurations of the frame 110 of a bicycle 120, a person having ordinary skill in the art may deem it desirable to use two fasteners, four fasteners, or even a single fastener, which may be a threaded bottom bracket, to secure the bracket 100 to the frame 110. In some embodiments, the bracket and frame could be secured to one another with a chemical adhesive. The precise attachment structure or method may be selected from a variety of structures. A representative customary structure is illustrated merely as an example.

Figure 16:
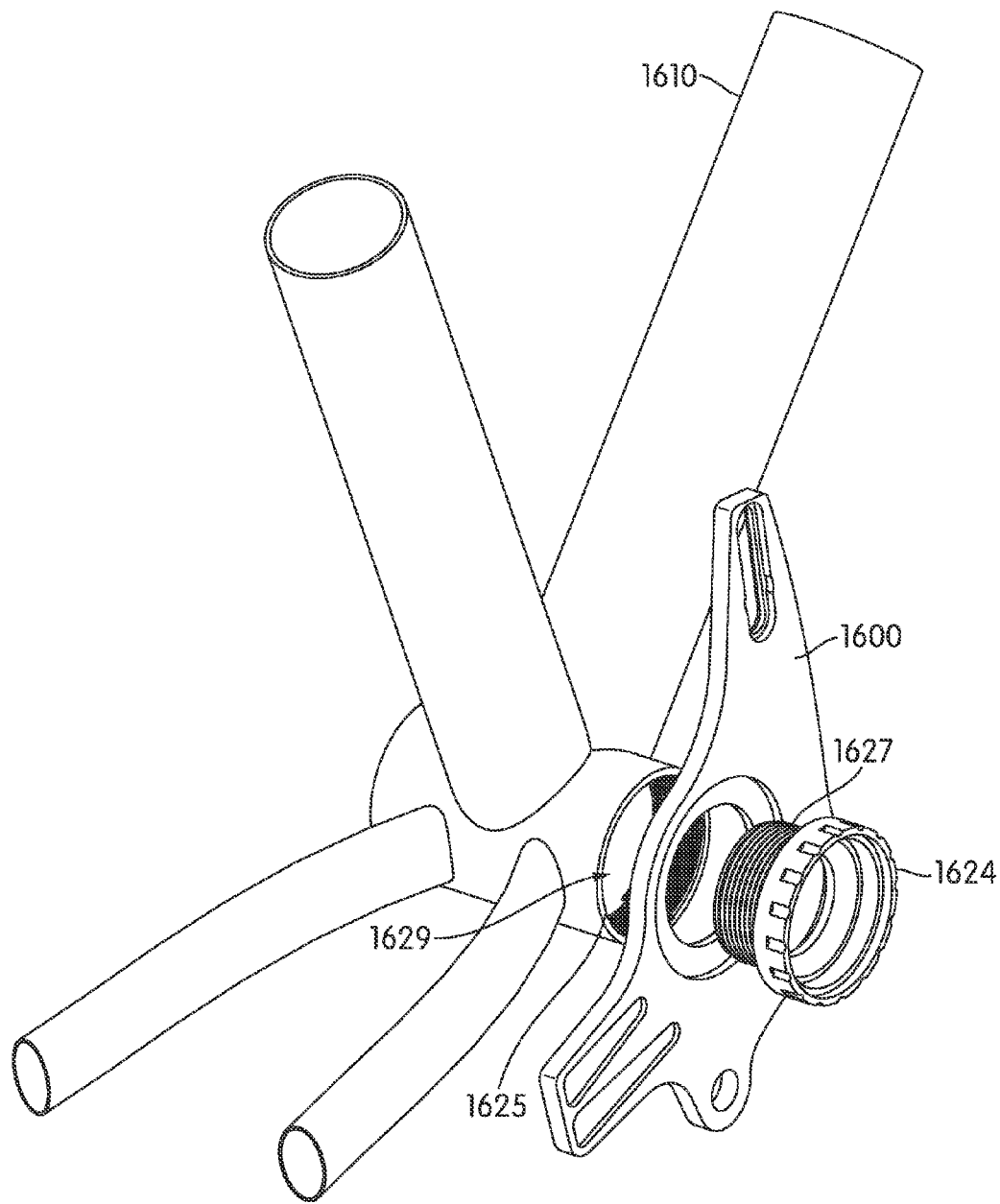
FIG. 16 is a perspective view of a portion of a frame showing an alternative attachment structure.

Turning to FIG. 16, an alternative embodiment of a bracket attachment structure is disclosed. In FIG. 16, the bracket 1600 is attached to the frame 1610 using a single fastener 1624. In the FIG. 16 embodiment, the single fastener 1624 may include a threaded end 1627. Threaded end 1627 may mate with a matching thread 1625 within an aperture 1629 in the frame 1610. After the threaded end 1627 and the matching thread 1625 have been completely mated, the bracket 1600 may be sandwiched in place between the fastener 1624 and the frame 1610 and may be substantially prevented from rotating or otherwise moving relative to the frame 1610. This set of structures may thereby be used to secure the bracket 1600 and frame 1610 to one another.

Figure 4:
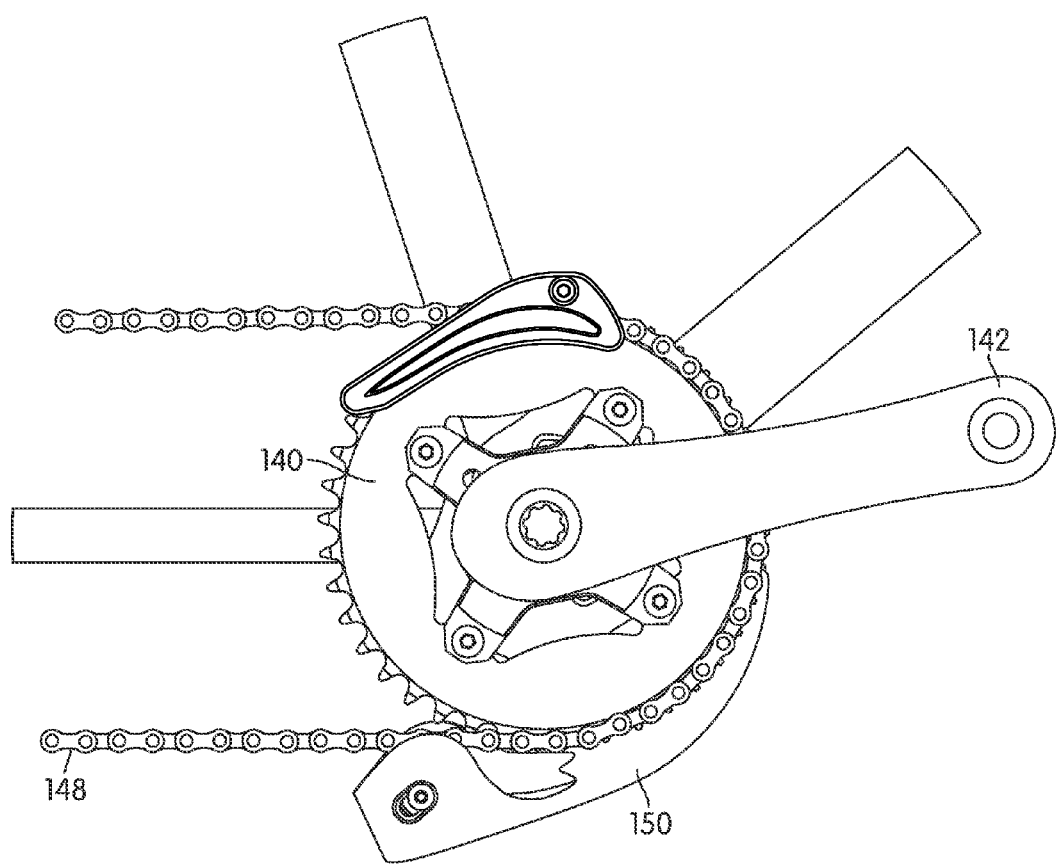
FIG. 4 is a side view of the structure of FIG. 3 to which some drive train components have been attached.

Turning now to FIG. 4, after the bracket 100 is installed or attached to the frame 110, additional drivetrain components may also be installed on bicycle 120. For example, a crank axle 142 may be inserted through the first aperture 122 in the bracket 100 and a bore 138 in the frame 110 (some features shown more clearly in FIG. 3). One or more chain rings can then be attached in a conventional or any appropriate manner to the crank axle. In the illustrated embodiments, first chain ring 140 may be attached to the crank axle. A person of ordinary skill in the art can select an appropriate number and size of chain rings for a particular application. A set of pedals including first pedal 144 and second pedal 146 (see FIG. 1) may be attached to opposite ends of the crank axle to allow a user to propel the bicycle 120. A chain 148 may also be installed in partially surrounding position to first chain ring 140.

Figure 5:
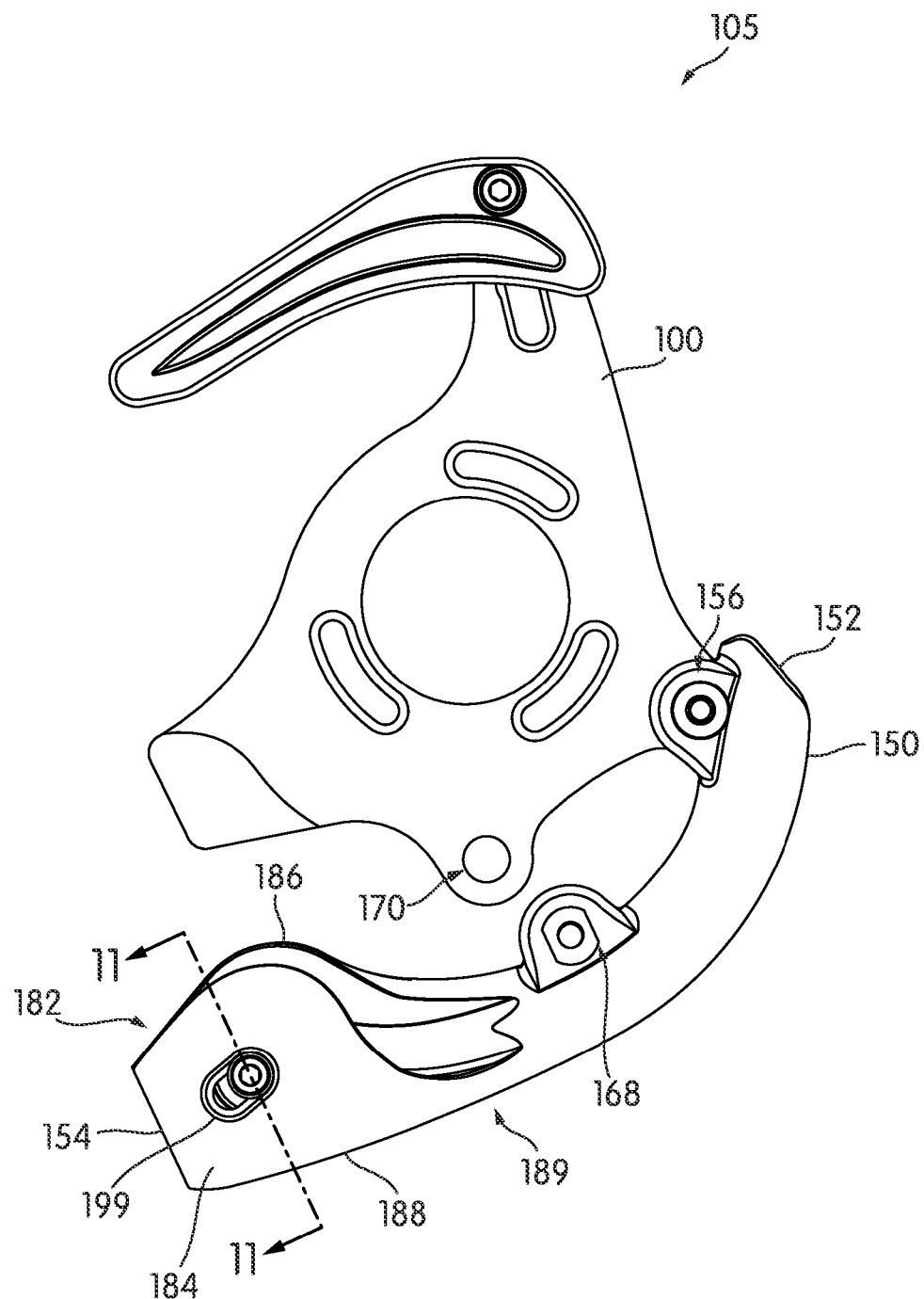
FIG. 5 is a side view of one embodiment of a guard according to the present disclosure.
Figure 6:
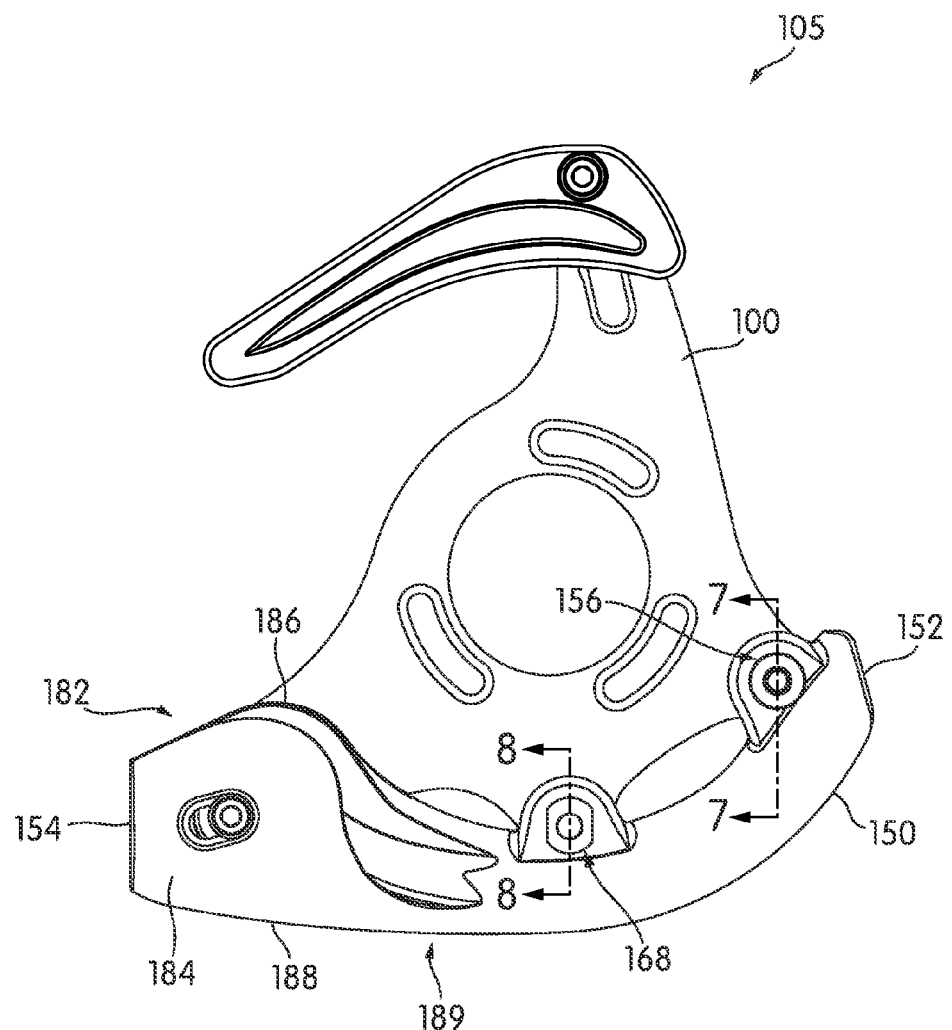
FIG. 6 is a side view of one embodiment of a guard according to the present disclosure with one embodiment of a bracket extension in a rotated position.

Once some or all of the drive train components have been installed, bracket extension 150 may then be moved into operable position. FIGS. 5 and 6 show the guard 105 separately from the bicycle and its related components. While it will be apparent to a person having ordinary skill in the art that these steps will be performed while the guard is attached to the frame of a bicycle, the parts are shown separately for ease of understanding. In some embodiments, bracket extension 150 and bracket 100 may be attached to one another in a first location before bracket 100 is attached to frame 110. In other embodiments, bracket extension 150 and bracket 100 may be later attached to one another in the first location. It may be desirable in many embodiments for bracket extension 150 to be removably attached to bracket 100 to allow bracket extension 150 to be removed from bracket 100 at any time and replaced. In some embodiments and use conditions, bracket extension 150 may be more likely to be damaged than bracket 100. If bracket extension 150 is removable from bracket 100, then bracket extension 150 may be replaced without the need to remove or replace any drive train component, such as a chain ring 140 or bike chain 148, or remove the bracket 100 from the frame. This may aid a user in maintaining the guard 105 in operable position and condition.

Figure 7:
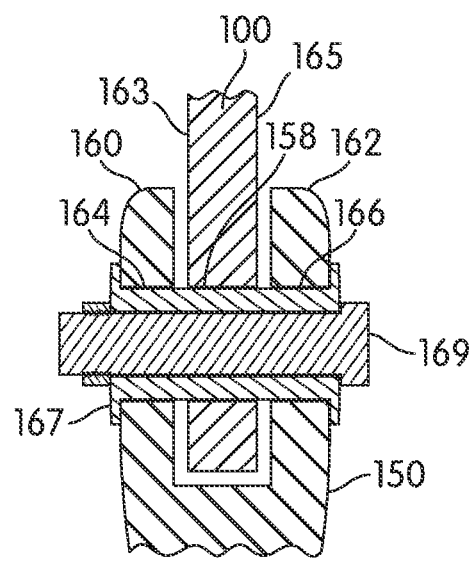
FIG. 7 is a cross-sectional view taken along line 7-7 of FIG. 6.

The bracket extension 150 may have a first end 152 and a second end 154. In the embodiment shown in FIGS. 5 and 6, the bracket extension 150 is made of one integral piece. Adjacent or near the first end 152 there may be defined a first aperture 156. First aperture 156 of bracket extension 150 may correspond to a fifth aperture 158 defined in bracket 100, thereby forming a first corresponding set of apertures. FIG. 7 shows this interaction in greater detail. In some embodiments, it may be desirable for first aperture 156 of bracket extension 150 and fifth aperture 158 in bracket 100 to correspond in shape and size to one another. A correspondence in shape and size may allow a fastener to be used to more easily fasten the bracket extension 150 to the bracket 100. In some embodiments, such as the one shown in FIG. 7, first aperture 156 of bracket extension 150 may include a plurality of apertures. A first finger 160 and a second finger 162 may be placed adjacent one another and extend from an area adjacent the first end 152 of the bracket extension 150. The first finger 160 may include or define first finger aperture 164. The second finger 162 may include or define second finger aperture 166. Together, first finger aperture 164 and second finger aperture 166 may comprise first aperture 156. First finger aperture 164, second finger aperture 166, and first end 152 may be configured to allow first finger aperture 164 to be placed on one lateral side 163 of fifth bracket aperture 158 and second finger aperture 166 to be placed on the other lateral side 165 of fifth bracket aperture 158. A fastener 169 can then be passed through first finger aperture 164, fifth bracket aperture 158, and second finger aperture 166. It may be desirable to select a fastener 169 of a shape, size and configuration such that after the fastener 169 is placed in operable position through all the apertures and secured in place, there is adequate clearance and friction between the fastener 169 and the apertures that the bracket 100 and the bracket extension 150 are permitted to rotate relative to one another. A bushing, such as annular bushing 167, may also be included to enhance the ability of the bracket 100 and the bracket extension 150 to rotate. In many embodiments, it may be desirable to use a split bushing as the annular bushing 167. When the bracket 100 has been secured to the frame 110 of the bicycle 120, the bracket extension 150 may be permitted to rotate, and in particular, the second end 154 of the bracket extension 150 may swing away from the bracket 100 and the drive train components, as is shown in FIG. 5. This combination of steps and structures may combine to form the attachment of the bracket 100 and the bracket extension 150 in the first location.

While in the illustrated embodiments there are two fingers, each of which includes an aperture, alternative embodiments are also available. For example, in some embodiments it may be desirable that only a single finger extend from the bracket extension and define an aperture. In other embodiments, it may be desirable to omit the finger configuration and instead define an aperture within the primary portion of the bracket extension without the use of any extending fingers. Each of these configurations has different qualities of strength, torsional rigidity, and appearance. A person having ordinary skill in the art can select a configuration that would be appropriate for the balance of these characteristics in a particular application.

Figure 17:
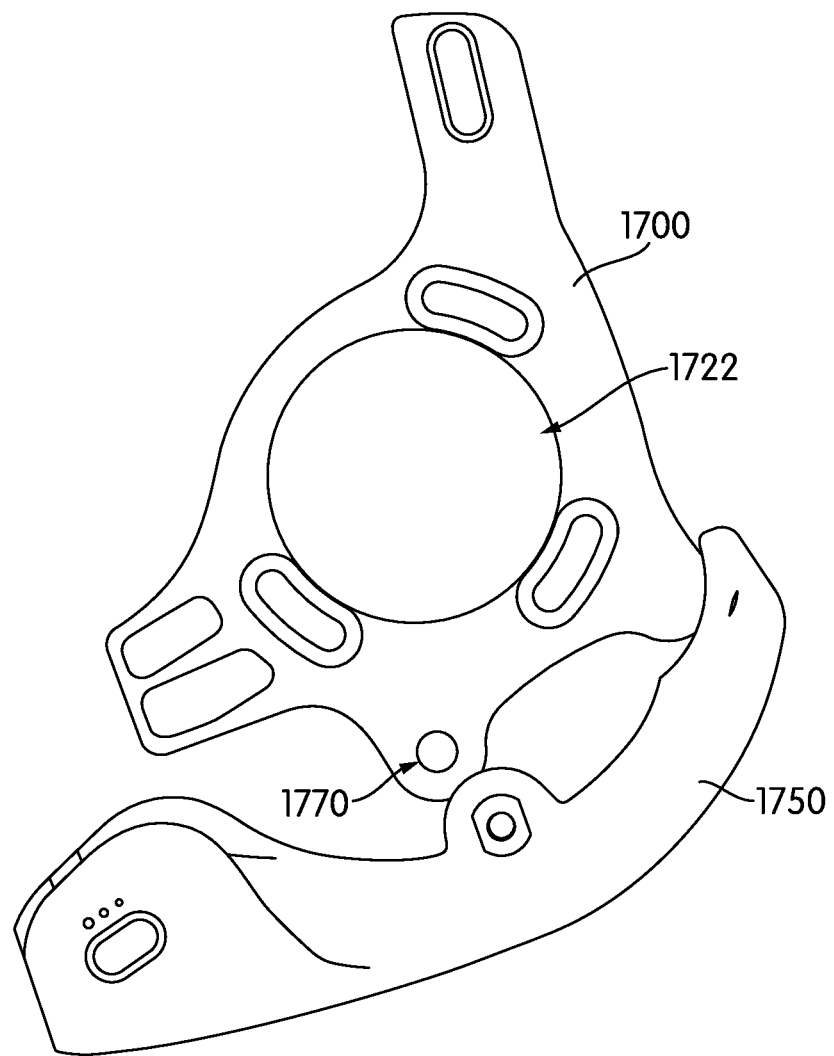
FIG. 17 is a side view of another embodiment of a guard according to the present disclosure.

A further alternative embodiment is shown in FIGS. 17-20. In the embodiment shown in FIGS. 17-20, the bracket and the bracket extension are rotatably or pivotably removably secured to one another in a first location without the use of a fastener as shown in the remaining FIGS. FIG. 17 shows a bracket 1700 that is capable of being secured or configured to be secured to the frame (not shown) of a bicycle (not shown). The bracket 1700 may include a first bracket aperture 1722 and a second bracket aperture 1770. The first bracket aperture 1722 may be configured to have a shape and size configured to receive a crank axle (not shown) of a bicycle. In this manner, the bracket 1700 may be configured to be secured to the bicycle in surrounding relation to the bicycle crank axle in a manner similar to those illustrated and described above in connection with other embodiments.

Figures 18, 19:
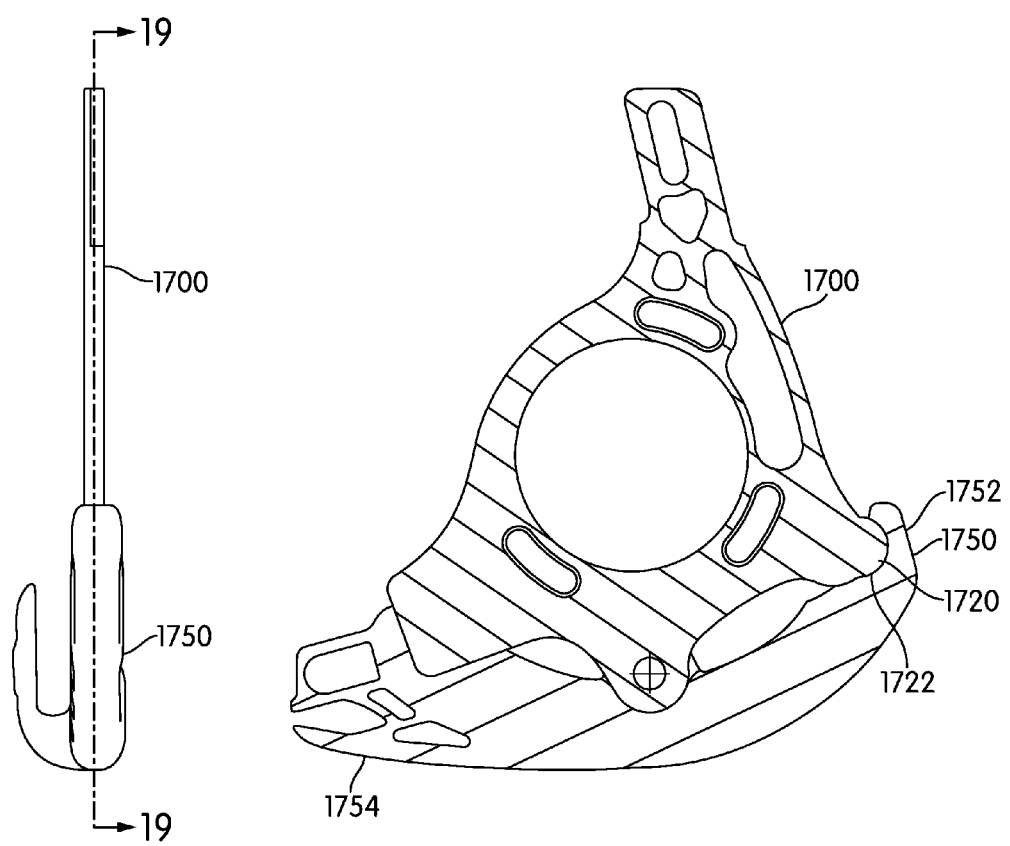
FIG. 18 is a front view of the guard of FIG. 17.
FIG. 19 is a cross-sectional view of the guard of FIG. 17 taken along line 19-19 of FIG. 18.
Figure 20:
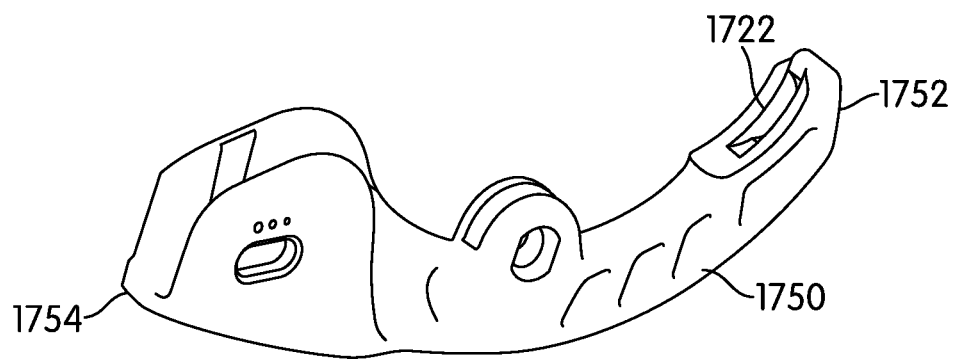
FIG. 20 is a perspective view of an embodiment of a bracket extension that may be used with the guard of FIG. 17.

A bracket extension 1750 may be configured to be removably and rotatably secured to the bracket 1700. The bracket extension 1750 may have a first end 1752 and a second end 1754 (see FIG. 19). The bracket extension may be made of a continuous unitary piece. As is best seen in FIGS. 19 and 20, the bracket 1700 may include a finger 1720. The finger 1720 may be configured to fit within and rotatably interfit with a recess 1722 defined within the bracket extension 1750. In some embodiments, the finger 1720 may be configured to snap into place within the recess 1722. In other embodiments, a further projection or tongue may protrude from a side of either finger 1720 or recess 1722 and slidingly interfit with a groove on the other of finger 1720 or recess 1722. It may be desirable in many embodiments for the interfitting of the finger 1720 and the recess 1722 to be secure, so that unless a user specifically desires to separate the bracket 1700 and the bracket extension 1750, the bracket 1700 and the bracket extension 1750 generally remain rotatably secured to one another. However, because it may be desirable in some embodiments for a user to be able to remove and replace the bracket extension 1750, it may be desirable to configure the finger 1720 and the recess 1722 to be separable when desired. This combination of steps and structures may combine to form the attachment of the bracket 1700 and the bracket extension 1750 in the first location.

The remainder of FIGS. 17-20 show features that the embodiment of FIGS. 17-20 has in common with the remaining embodiments. A person having ordinary skill in the art will be able to understand how to use the structures and methods shown, described and illustrated in the remaining embodiments in connection with the alternative embodiment of FIG. 17. Accordingly, these features will not be separately described in connection with these FIGS.

In many embodiments, it is not desirable for the bracket extension 150 to hang loosely or pivotably from bracket 100 when the bicycle is being ridden by a user. Instead, it may be desirable for the bracket extension to be removably secured in place. In many embodiments, it may be desirable to removably secure bracket 100 and bracket extension 150 to one another in a second location different from the first location. In many embodiments, the removable securing of the bracket 100 and the bracket extension 150 in the second location may restrict or prevent the bracket 100 and the bracket extension 150 from rotating relative to one another. In many embodiments, it may be desirable or necessary for the bracket 100 and the bracket extension 150 to be removably secured to one another in both the first location and the second location to restrict or prevent the bracket 100 and the bracket extension 150 from rotating relative to one another.

In the embodiment shown in FIGS. 5 and 6, the bracket extension may include or define a second aperture 168. Second aperture 168 of bracket extension 150 may correspond to a sixth aperture 170 defined in bracket 100, thereby forming a second corresponding set of apertures. In some embodiments, it may be desirable for second aperture 168 of bracket extension 150 and sixth aperture 170 in bracket 100 to correspond in shape and size to one another. A correspondence in shape and size may allow a fastener 180 to be used to more easily fasten the bracket extension 150 to the bracket 100. In some embodiments, such as the one shown in FIG. 8, second aperture 168 of bracket extension 150 may include a plurality of apertures. A third finger 172 and a fourth finger 174 may be placed adjacent one another and extend from an area intermediate the first end 152 and the second end 154 of the bracket extension 150. The third finger 172 may include or define third finger aperture 176. The fourth finger 174 may include or define fourth finger aperture 178. Together, third finger aperture 176 and fourth finger aperture 178 may comprise second bracket aperture 168. Third finger aperture 176, fourth finger aperture 178, and the remainder of bracket extension 150 may be configured to allow third finger aperture 176 to be placed on one lateral side 173 of sixth bracket aperture 170 and fourth finger aperture 178 to be placed on the other lateral side 175 of sixth bracket aperture 170. A fastener can then be passed through third finger aperture 176, sixth bracket aperture 170, and fourth finger aperture 178. It may be desirable to select a fastener 180 of a shape, size and configuration such that after the fastener 180 is placed in operable position through all the apertures and secured in place, the bracket 100 and the bracket extension 150 are prevented from rotating with respect to one another. This combination of steps and structures may combine to form the attachment of the bracket 100 and the bracket extension 150 in the second location.

While in the illustrated embodiments there are two fingers, each of which includes an aperture, alternative embodiments are also available. For example, in some embodiments it may be desirable that only a single finger extend from the bracket extension and define an aperture. In other embodiments, it may be desirable to omit the finger configuration and instead define an aperture within the primary portion of the bracket extension without the use of any extending fingers. Each of these configurations has different qualities of strength, torsional rigidity, and appearance. A person having ordinary skill in the art can select a configuration that would be appropriate for the balance of these characteristics in a particular application.

Figure 8:
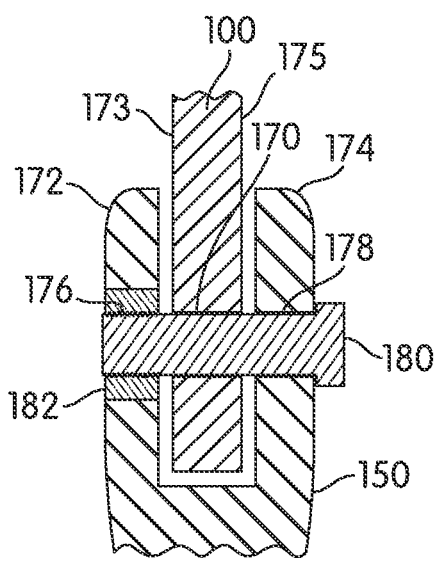
FIG. 8 is a cross-sectional view taken along line 8-8 of FIG. 6.
Figure 9:
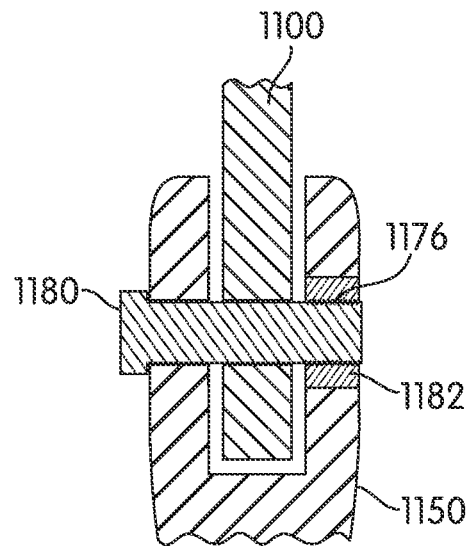
FIG. 9 is a cross-sectional view of an alternative embodiment of the cross-section of FIG. 8.

The fastener 180 shown in FIG. 8 is a bolt and nut configuration. This is an exemplary embodiment only. In FIG. 8, the nut 182 is shown as being embedded in bracket extension 150 in surrounding relationship to third finger aperture 176. This embedded fastener element is located on the bracket extension 150 outboard of the bracket 100, while the manipulable part of the fastener is located inboard of the bracket 100. In an alternative embodiment, shown in FIG. 9, a nut 1182 is embedded in bracket extension 1150 in surrounding relationship to fourth finger aperture 1176. This embedded fastener element is located on the bracket extension 1150 inboard of the bracket 1100, while the manipulable part of the fastener 1180 is located outboard of the bracket 1100. In other embodiments that are not illustrated, instead of the nut portion of the fastener being permanently affixed within the bracket extension, the bolt portion of the fastener may be permanently affixed within the bracket extension. In such an embodiment, a person having ordinary skill in the art may desire to make additional modifications relating to the size of the bolt, the nut to be used, the size of the corresponding hole, or the rigidity of the finger to be used with a permanently affixed nut. If only one finger and one finger aperture is used, or where the aperture on the bracket extension is not positioned on an extending finger, it would also be possible for the embedded fastener portion to be made part of the bracket. If the bolt is permanently embedded within the bracket or bracket extension, there remains an aperture in that element as that word is used within the context of this disclosure. If the bolt is embedded, the portion of the bracket or bracket extension that surrounds the embedded bolt is an "aperture" for purposes of this disclosure and claims.

In the illustrated embodiments, only two fasteners 169, 180 are shown connecting the bracket 100 and the bracket extension 150 to one another and the bracket 100 and the bracket extension 150 are shown as being removably secured to one another in only a first location and a second location. In another embodiment (not shown), a person having ordinary skill in the art may choose to include at least one more fastener to secure or removably secure the bracket 100 and the bracket extension 150 at three or more locations. These additional fasteners may be inserted in other locations along the bracket 100 and the bracket extension 150 through additional corresponding apertures. Alternative joining means or structures could alternatively be used instead of a fastener, merely one example being illustrated in FIGS. 17-20. A person having ordinary skill in the art can easily determine the precise locations for such additional locations as may be desired in a particular application. In addition, while the respective positions of the first location and the second location, illustrated by way of example in the positions of the fastener 169 and the fastener 180, are about the same in many of the illustrated embodiments, these locations are exemplary only. A person having ordinary skill in the art may choose to adjust the positions of these fasteners and the corresponding apertures to different locations for the first location and the second location as may be deemed desirable in other embodiments.

Further, the fasteners shown in the illustrated embodiments are exemplary only. For each fastener illustrated, there are several alternative fasteners that could be selected instead. In some embodiments, for example, it may be desirable to use a shorter bolt and a longer sleeve nut. In other embodiments, it may be desirable to use a pin-type fastener. In still other embodiments, a screw might be desirable. The use of embedded and non-embedded fasteners or fastener portions could also be changed. A person having ordinary skill in the art is able to easily select an appropriate fastener to use in a particular location, depending on the designer's wishes for length, tensile strength, torsional rigidity, ease of manufacture or assembly, or a combination of these and other relevant factors. The selection of any of these types of fasteners and others not mentioned is within the scope of the term fastener as used in this application.

Figures 10, 11:
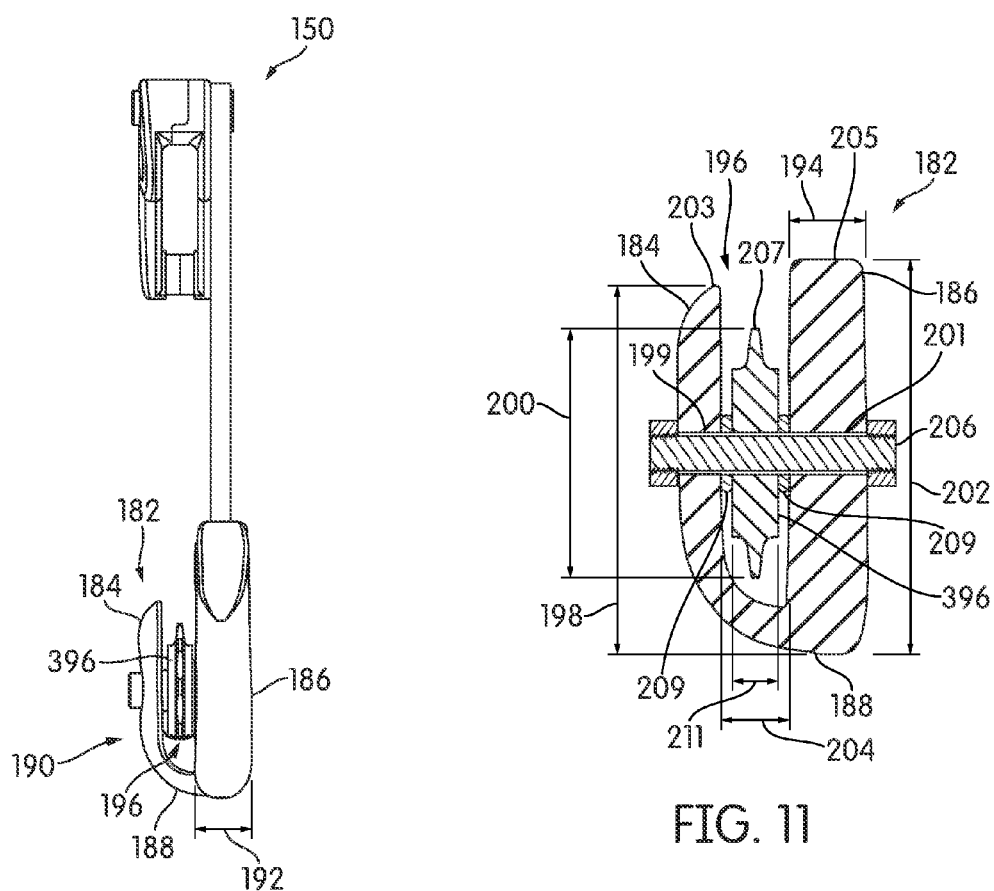
FIG. 10 is a front view of one embodiment of a guard according to the present disclosure.
FIG. 11 is a cross-sectional view taken along line 11-11 of FIG. 5.

Turning now to the second end 154 of the bracket extension, which is best seen in FIGS. 5, 6, and 10, there is incorporated into the second end an integral U-shaped portion, cavity or configuration 182. In the present application, the term "U" may be used in place of the term U-shaped configuration for ease of explanation. The U-shaped configuration 182 includes a first leg 184, a second leg 186, and a bottom 188. As best illustrated in FIG. 10, the first leg 184 may join the bottom 188 approximately perpendicularly. The bottom 188 may join the second leg 186 approximately perpendicularly. FIG. 10 shows that each of the first leg 184 and the second leg 186 may join the bottom 188 with a curved profile, both on the inner surface and the outer surface. The precise profile at which the first leg 184, the second leg 186, and the bottom 188 are joined may depend on a number of factors. For example, the material from which second end 154 is formed may have properties or characteristics which make it more likely to retract from a mold surface on cooling and thereby smooth any edges. In addition, in some embodiments it may be desirable for the surfaces to be curved. For example, it may be desirable for outer surface 190 to be curved, particularly in the area where first leg 184 meets bottom 188. A curved surface in this area may deflect obstructions, such as large rocks, rather than absorbing impact force directly against corners or projecting edges, and this deflection may reduce the risk of damage to the guard. A person having ordinary skill in the art will also include other considerations in determining what radius of curvature would be appropriate between any of the junctions between segments of second end 154.

The U-shaped portion 182 may be desirably integrally formed with or in the second end 154. Second end 154 may extend either forwardly, rearwardly, or both from each leg of the U-shaped portion. Because second end 154 is integrally formed with the U-shaped portion 182, the second end 154 may be considered to extend away from each of first leg 184, second leg 186, and bottom 188. In some embodiments, such as the one illustrated in FIGS. 5, 6, 10 and 11, the second leg 186 may extend seamlessly into the rest of second end 154.

The use of an integral formation of the U-shaped portion 182 may allow for a superior strength versus weight for a material chosen for making second end 154. In addition, the use of an integrally formed U-shaped portion 182 and second end 154 may have a simplicity of design and ease of manufacture. These features may be particularly apparent when compared to devices where the legs of the U are bolted or otherwise mechanically joined to one another. The disclosed integral formation provides at least the same advantages over devices in which the legs of the U themselves are integrally formed, but must be mechanically joined to the portion of the second end that extends away from the U.

As is also best seen in FIGS. 5 and 6, the portion of second end 154 that forms the second leg 186 may have a different profile or contour from the remainder of the second end 154. This area is generally labeled 189. In some embodiments, it may be desirable for some of the second end 154 to have a first thickness 192 and for the portion of the second end 154 forming second leg 186 to have a second thickness 194 (see FIG. 11). The first thickness 192 may, in some embodiments, be greater than the second thickness 194.

Among the reasons that a contour, or change in thickness, along second end 154 may be desirable is that the bracket extension may be designed to incorporate a chain retainer 196. The chain retainer 196 may be configured to be placed into close proximity with a chain where it exits a chain ring. The use of such a chain retainer 196 may minimize the risk of a chain disengaging the chain ring. The use of the chain retainer 196 may block any obstacles that might otherwise catch on the chain in that area and cause it to become disengaged from the chain ring. In addition, the chain retainer 196 may increase the number of teeth to which the chain has contact during use. The chain retainer may be designed to perform other functions as may be desired by a person having ordinary skill in the art.

As is best shown in FIGS. 10 and 11, the U-shaped portion 182 may be designed to house and at least substantially cover the chain retainer 196. The first leg 184 may have a height 198 that is at least as great as a height 200 of the chain retainer 196. The second leg 186 may have a height 202 that is at least as great as a height 200 of the chain retainer 196. The bottom 188 may have a width 204 that is at least as great as a width 211 of the chain retainer 196. In many embodiments, it may be desirable for the chain retainer 196 and the U-shaped portion 182 to be designed so that when chain retainer 196 is positioned within the U-shaped portion 182, there is clearance between the chain retainer 196 and each of the first leg 184, the second leg 186, and the bottom 188. In many embodiments, it may be desirable for the chain retainer 196 to be slidable or laterally adjustable within the U-shaped portion 182 relative to bracket 100. While the chain retainer 196 is shown in the illustrated embodiments as being slidably adjustable relative to the bracket 100 and bracket extension 150, in some embodiments it may be desirable for the chain retainer 196 to be positioned in fixed relationship to both the bracket 100 and the bracket extension 150. A person having ordinary skill in the art is able to change the configurations illustrated to place the chain retainer 196 in fixed relationship to the bracket 100 and bracket extension 150.

In the illustrated embodiments, the bottom 188 of the U-shaped portion is shown as being positioned between the chain retainer 196 and the ground when the bicycle is in its operable position. In other embodiments, it may be desirable for the bottom 188 of the U-shaped portion to be positioned at an angle to the ground to protect the chain retainer 196, bicycle chain 148, and chain ring 140. A person having ordinary skill in the art can make the appropriate modifications to provide the protection that is desired in a particular embodiment.

In FIGS. 10 and 11, the chain retainer 196 is shown as being a rotatable pulley 396. The rotatable pulley 396 may be housed within the U-shaped portion 182. As further shown in FIGS. 5 and 6, a first slot 199 may be defined in first leg 184. A second slot 201 may be defined in second leg 186. First slot 199 may be defined adjacent the free end 203 of the first leg 184 and second slot 201 may be defined adjacent the free end 205 of the second leg 186. Alternatively, first slot 199 and second slot 201 may be defined further away from the respective free ends 203, 205. As shown in FIG. 11, a fastener 206 may be used to secure rotatable pulley 396 within the U-shaped portion 182. The fastener 206 may extend from the first slot 199, through the rotatable pulley 396, to the second slot 201. The fastener 206 may be an axle with two threaded ends that mate with nuts that may be installed on either end of the axle. If the fastener 206 is an axle, the rotatable pulley 396 may be configured to rotate about the axle.

In an alternative embodiment, the fastener 206 may extend only from one of the slots 199, 201 to the chain retainer 196. If such a configuration is used, it may further be desirable to insert a spacer 209 between the chain retainer 196 and the leg 184 or 186 to which the retainer is secured.

It may be desirable in many embodiments to slidingly secure the chain retainer 196 within the U-shaped portion 182 of the bracket extension 150 before the bracket extension 150 is attached to the bracket 100. In other embodiments, it may be desirable to slidingly secure the chain retainer 196 within the U-shaped portion 182 of the bracket extension 150 after the bracket extension 150 is attached to the bracket 100, but before the fastener is inserted to prevent the bracket 100 and bracket extension 150 from rotating relative to one another. This is due to ease of assembly. A variety of diameters of chain rings may be used in connection with any given bicycle. If the chain retainer were to be fully secured in a single location along the bracket extension 150, it would limit the sizes of chain rings with which the guard 105 could be used. The use of a slidable attachment of the chain retainer 196 within the bracket extension 150 may allow the use of the disclosed guard in connection with a greater variety of bicycle configurations. Accordingly, regardless of when the chain retainer 196 is initially positioned within the bracket extension 150, it may be desirable to permit it to slide.

Figure 12:
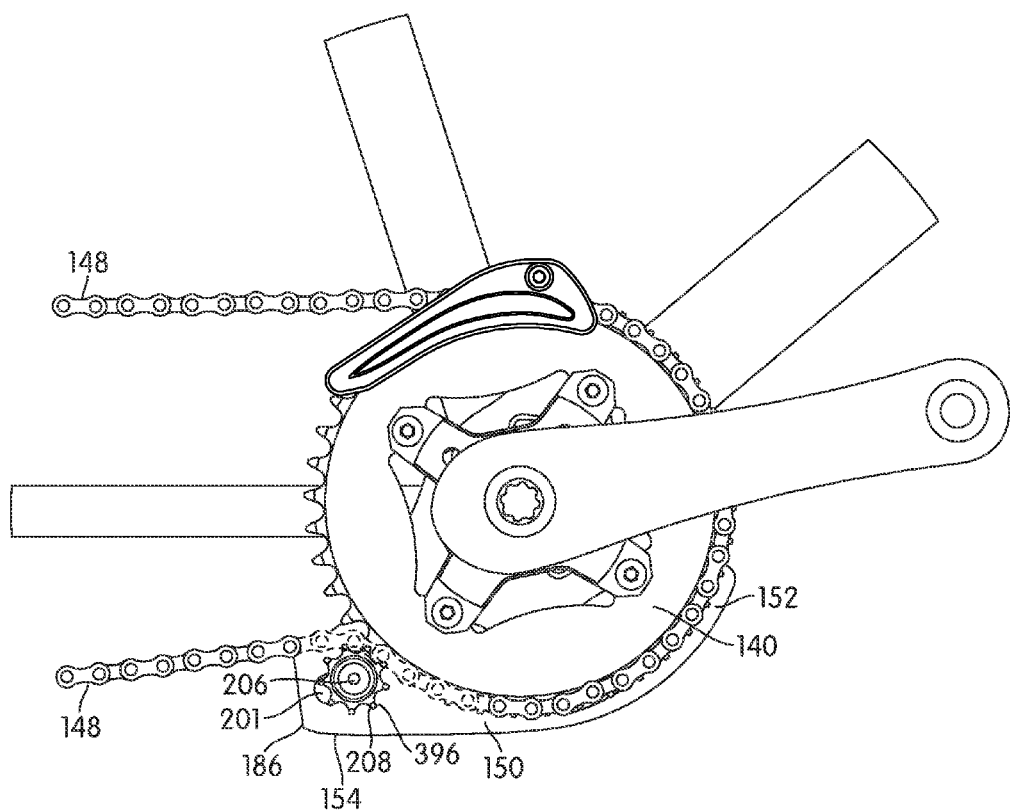
FIG. 12 is a side view, partially cutaway, of one embodiment of a guard according to the present disclosure in operative position.

When the bracket extension 150 has been rotated into its fixed position, the rotatable pulley 396 can then be moved within the slots relative to the bracket extension 150 and the chain 148. This configuration is shown in FIG. 12. In FIG. 12, first leg 184 is omitted, so that the structures behind it can be viewed and understood. A person having ordinary skill in the art will understand that the first leg 184 will continue to function as earlier described. In many embodiments, it may be desirable to position the teeth 208 of the pulley 396 so that they engage the chain 148 in a position adjacent the area where the chain 148 exits the chain ring 140. The use of this pulley 396 may cause the chain 148 to remain in contact with the chain ring 140 over a greater surface area, thereby minimizing the risk of the chain 148 becoming disengaged from the chain ring 140. Once the pulley 396 has been positioned in the location desired, the fastener 206 can be fully engaged and tightened and the pulley 396 will remain in that position. Because of the desire for the guard 105 to have flexibility, it may be desirable to use a fastener 206 that allows a user to loosen the fastener 206 and slide the pulley 396 away from its desired location. This slidability may allow a user greater ease of access for repairs and cleaning.

Figure 13:
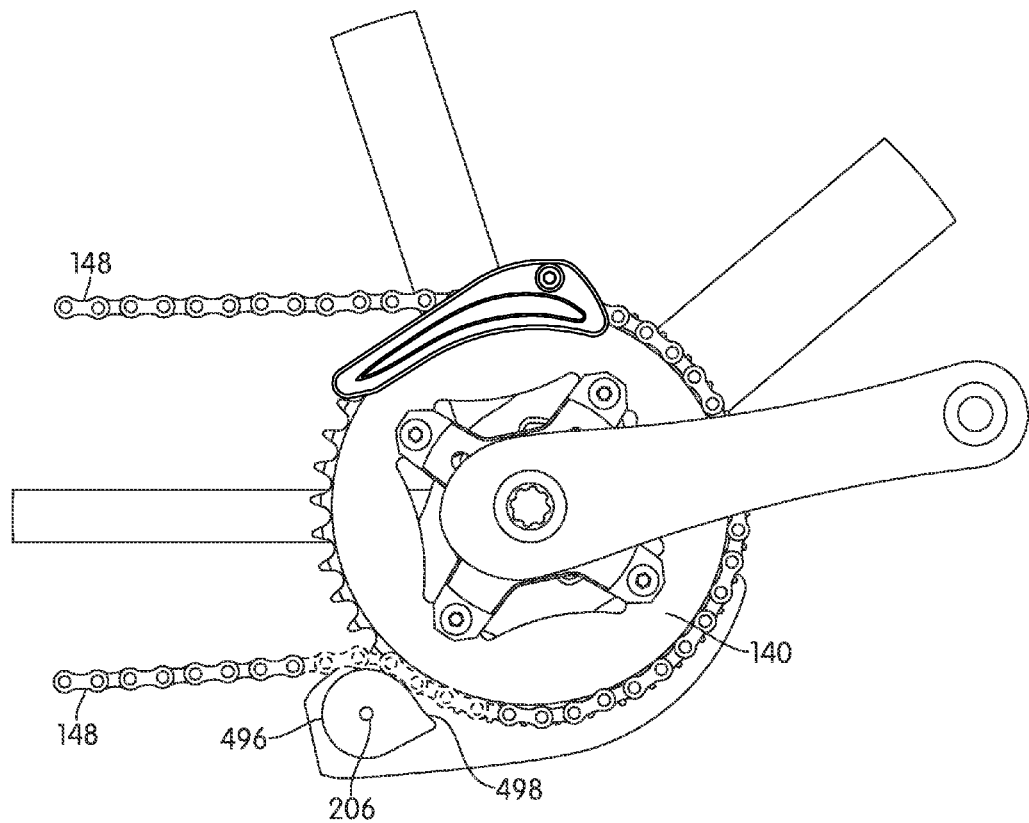
FIG. 13 is a side view, partially cutaway, of another embodiment of a guard according to the present disclosure in operative position.

In an alternative embodiment shown in FIG. 13 in a manner similar to that in FIG. 12, a slide 496 may be used in place of the rotatable pulley 396. The slide 496 may be a block of low friction material attached to, or integral with, the bracket extension 150 in the same manner as described above for the pulley 396. The bracket extension may be configured to permit the bracket extension 150 to house the slide 496 in the same way as was described with the rotatable pulley 396 and more generically as the bike chain retainer 196. In many embodiments, it may be desirable to position a top surface 498 of the slide 496 so that the top surface 498 engages the chain 148 in a position adjacent the area where the chain 148 exits the chain ring 140. The use of this slide 496 may cause the chain 148 to remain in contact with the chain ring 140 over a greater surface area, thereby minimizing the risk of the chain 148 becoming disengaged from the chain ring 140. Once the slide 496 has been positioned in the location desired, the fastener 206 can be fully engaged and tightened and the slide 496 will remain in that position. Because of the desire for the guard 105 to have flexibility, it may be desirable to use a fastener 206 that allows a user to loosen the fastener 206 and slide the slide 496 away from its desired location. This slidability may allow a user greater ease of access for repairs and cleaning.

In the embodiments shown in FIGS. 10-13, the bicycle chain retainer 196 is shown as being completely covered by the U-shaped configuration. A person having ordinary skill in the art knows that while such a configuration may be desirable, modifications may be made. It may be desirable in many embodiments for the U-shaped configuration to substantially cover, house, or enclose the chain retainer. For example, the height 198 of first leg 184 may allow a top edge 207 (see FIG. 11) of the chain retainer 196 to be exposed. Similarly, a front edge or back edge of chain retainer 196 may be exposed by first leg 184 or second leg 186. While it may be desirable for the U-shaped configuration to protect the chain retainer 196 from damage, the chain retainer 196 may be only substantially covered instead of fully covered and achieve the same purpose. Whether some of chain retainer 196 is exposed or all of chain retainer 196 is housed within the U-shaped configuration, chain retainer 196 is considered to substantially fit within the U-shaped configuration.

The embodiments discussed and shown above use a single-piece bracket extension 150 with a first end 152 and a second end 154, these ends being opposite one another on an integrally formed extension 150. However, other embodiments are possible that include a two piece extension.

Figure 14:
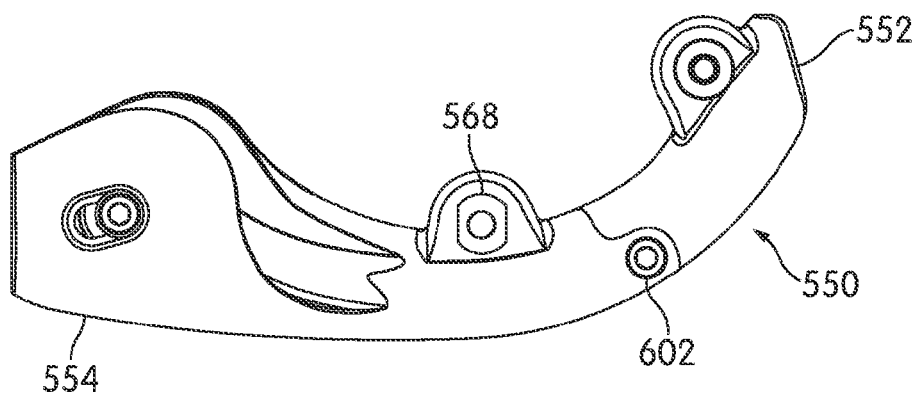
FIG. 14 is a side view of one embodiment of a bracket extension according to the present disclosure.
Figure 15:
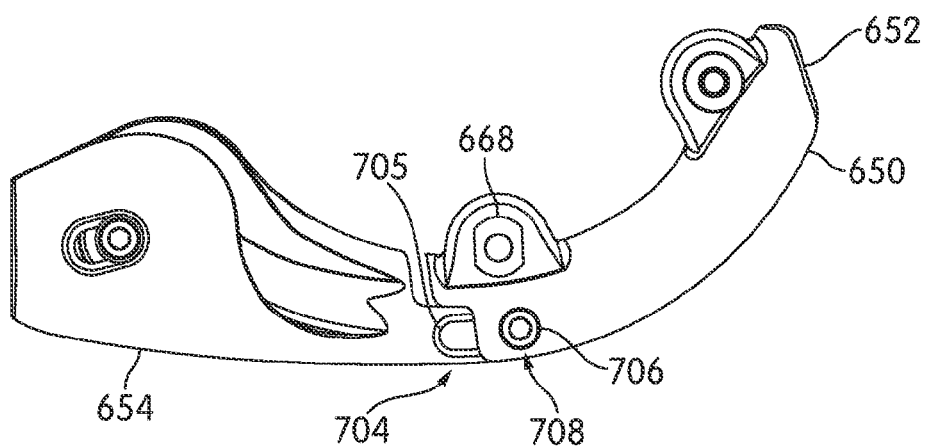
FIG. 15 is a side view of another embodiment of a bracket extension according to the present disclosure.

Turning now to FIGS. 14 and 15, alternative embodiments to bracket extension 150 are shown. The features of each extension in each of FIGS. 14 and 15 are the same as those described in connection with extension 150, except as described below.

Turning first to FIG. 14, an alternative bracket extension 550 is shown. Bracket extension 550 has an integrally formed first end 552 and an integrally formed second end 554. First end 552 and second end 554 are joined to one another in a section adjacent second bracket extension aperture 568. While it is shown in FIG. 14 that the first end 552 and the second end 554 are joined forwardly of second bracket extension aperture 568, it is also possible that the first end 552 and the second end 554 could be joined rearwardly of second bracket extension aperture 568. FIG. 14 shows the first end 552 and second end 554 being joined to one another with a conventional fastener 602, and any known fastening structure or method can be used to secure first end 552 and second end 554 to one another. In this embodiment, first end 552 and second end 554 together form bracket extension 550.

Turning now to FIG. 15, an additional feature is disclosed. In FIG. 15, there is shown another alternative bracket extension 650. Bracket extension 650 has an integrally formed first end 652 and an integrally formed second end 654. First end 652 and second end 654 together form bracket extension 650. First end 652 and second end 654 are joined to one another in a section adjacent second bracket extension aperture 668. FIG. 15 shows the first end 652 and second end 654 being slidably joined to one another. As noted above in connection with the various embodiments of the chain retainer 196, it may be desirable for the chain retainer 196 to be laterally slidable or adjustable with respect to bracket 100. In some embodiments, it may be desirable for the structure providing the slidability of the chain retainer 196 to be remote from the chain retainer 196. In other embodiments, it may be desirable for there to be a greater range of slidability or for the length of the bracket extension 650 as a whole to be adjustable. In such a circumstance, a length adjuster 704 may be incorporated into the junction between first end 652 and second end 654. As shown in the embodiment shown in FIG. 15, a slot 705 may be incorporated into second end 654. A fastener 706 may be inserted through an aperture 708 in first end 652 and through the slot 705 in second end 654. The fastener 706 may be tightened to prevent sliding and loosened to allow sliding. Other structures can be used as a length adjuster 704. For example, the slot could be incorporated into first end 652. In another example, a series of spaced apertures could be included instead of a slot. A person having ordinary skill in the art can easily make whatever modifications would be desirable to allow for a length adjusting feature.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A guard for protecting a chain and chain ring of a bicycle, comprising:
   a bracket capable of being secured to the frame of a bicycle, said bracket defining at least a first bracket aperture and a second bracket aperture, the first bracket aperture being configured to receive a crank axle of the bicycle; and
   a bracket extension removably and rotatably secured to the bracket and having a first end and a second end, the bracket extension being made of a continuous unitary piece, the bracket extension defining at least a first bracket extension aperture, wherein
      the first bracket extension aperture and the second bracket aperture correspond to one another and form a first set of corresponding apertures, such that when the first set of corresponding apertures are placed adjacent one another, the first set of corresponding apertures are configured to allow a fastener to pass through the first set of corresponding apertures and thereby restrict the bracket and the bracket extension from rotating relative to one another;
      the bracket defines a third bracket aperture and the bracket extension defines a second bracket extension aperture and the second bracket extension aperture and the third bracket aperture correspond to one another and form a second set of corresponding apertures, such that when the second set of corresponding apertures are placed adjacent one another, the corresponding apertures are configured to allow a second fastener to pass through the second set of corresponding apertures and thereby allow the bracket and the bracket extension to rotate relative to one another; and
      the second end of said bracket extension is integrally formed as one piece and has a U-shaped configuration including a first leg, a second leg, and a bottom seamlessly joined with one another and configured to allow a bicycle chain to pass within the U-shaped configuration when in operative position, the bottom positioned near a bottom end of each of the first leg and the second leg, free ends of the first leg and the second leg being unjoinedly spaced from one another.

2. The guard of claim 1, wherein the bracket extension defines a recess.

3. The guard of claim 2, wherein the bracket further includes a finger configured to rotatably interfit with the recess in the bracket extension.

4. The guard of claim 1, wherein the bottom of the U-shaped configuration is positioned to be vertically directly between a separate bike chain retainer within the U-shaped configuration and the ground when the guard is secured to a bicycle in operative position.

5. The guard of claim 1, wherein a slot is defined in at least one leg of the U-shaped configuration and wherein at least one bike chain retainer is slidingly secured to the bracket extension with a fastener extending between the at least one bike chain retainer and the slot.

6. The guard of claim 1, wherein the first bracket extension aperture is defined in a first finger and a second finger extending from the bracket extension, an aperture being defined in each of the first finger and the second finger, and the first finger and second finger being configured to be positioned on a respective first side and second side of the bracket adjacent the second bracket aperture to allow a fastener to pass through each adjacent aperture and restrict the relative rotation of the bracket and the bracket extension.

7. The guard of claim 1, wherein the second bracket extension aperture is defined in a first finger and a second finger extending from the bracket extension, an aperture being defined in each of the first finger and the second finger, and the first finger and second finger being configured to be positioned on a respective first side and second side of the bracket adjacent the third bracket aperture to allow a fastener to pass through each adjacent aperture and permit the relative rotation of the bracket and the bracket extension.

8. The guard of claim 4, wherein the at least one bike chain retainer comprises a rotatable pulley.

9. The guard of claim 8, wherein the pulley is attached to the bracket extension with a fastener comprising an axle about which the pulley is configured to rotate.

10. The guard of claim 4, wherein the at least one bike chain retainer comprises a slide.

11. The guard of claim 5, wherein the slot is positioned adjacent the free end of each leg of the U-shaped configuration on the second end.

12. The guard of claim 4, wherein the bottom of the U-shaped second end is at least as long as the at least one bike chain retainer.

13. A guard for protecting a chain and chain ring of a bicycle, comprising:
    a bracket configured to be secured to the frame of a bicycle, said bracket defining at least one aperture of a shape and size to receive a crank axle of a bicycle; and
    a bracket extension secured to the bracket and having a first end and a second end, the second end including a portion having a U-shaped configuration being configured to allow passage of a bicycle chain, wherein the U-shaped configuration includes at least a first leg a second leg, and a bottom seamlessly joined with one another as one piece, the bottom positioned near a bottom end of each of the first leg and the second leg, free ends of the first leg and the second leg being unjoinedly spaced from one another, the second end further extends away from the first leg and the second leg, and the second end is integrally formed.

14. The guard of claim 13, wherein the bottom of the U-shaped configuration is positioned to be vertically directly between a separate bike chain retainer within the U-shaped configuration and the ground when the guard is secured to the bicycle.

15. The guard of claim 13, wherein a slot is defined in at least one of the first leg and the second leg of the U-shaped configuration and wherein at least one bike chain retainer is slidingly secured to the extension with a fastener extending between the at least one bike chain retainer and the slot.

16. The guard of claim 15, wherein the slot is positioned adjacent a free end of each leg of the U-shaped configuration on the second end.

17. The guard of claim 15, wherein the at least one bike chain retainer comprises a rotatable pulley.

18. The guard of claim 17, wherein the pulley is attached to the extension with a fastener comprising an axle about which the pulley is configured to rotate.

19. The guard of claim 13, wherein the at least one bike chain retainer comprises a slide.

20. The guard of claim 15, wherein a bottom of the U-shaped configuration on the second end is at least as long as the at least one bike chain retainer.

21. The guard of claim 13, wherein the bracket and the bracket extension are secured to one another in a manner to permit the bracket and the bracket extension to rotate relative to one another.

22. The guard of claim 15, wherein the at least one bike chain retainer is slidable.

23. The guard of claim 22, wherein the at least one bike chain retainer is slidable within the second end of the bracket extension.

24. The guard of claim 22, wherein the at least one bike chain retainer is slidable by sliding the first end of the bracket extension relative to the second end of the bracket extension.

25. The guard of claim 13, wherein the bracket extension is formed integrally.

26. A guard for protecting a chain and chain ring of a bicycle, comprising:
 a bracket configured to be secured to a bicycle frame in at least partially surrounding relation to a bicycle crank axle;
 a bracket extension configured to be removably secured to the bracket in at least a first location and a second location, wherein
  the bracket and the bracket extension are removably secured at the first location in a manner that permits the bracket and the bracket extension to rotate relative to one another when the bracket and the bracket extension are removably secured at only the first location;
  the bracket and the bracket extension are removably secured at the second location in a manner that prevents the bracket and the bracket extension from rotating relative to one another when the bracket and the bracket extension are removably secured at both the first location and the second location; and
  the bracket and the bracket extension are removably secured at the second location by a fastener that includes a first part and a second part, wherein one of the first part and the second part is fixed relative to the bracket extension and only the other of the first part and the second part is configured to be manipulated to secure the bracket and the bracket extension to one another.

27. The guard according to claim 26, wherein the manipulable part of the second fastener is positioned on an inboard side of the bracket.

28. The guard according to claim 26, wherein the manipulable part of the second fastener is positioned on an outboard side of the bracket.

29. The guard according to claim 26, further comprising a chain retainer positioned within a cavity formed between a first leg and a second leg of a retainer holder on the bracket extension, wherein the first leg and the second leg are seamlessly joined and integrally formed together as one piece.

30. The guard according to claim 29, wherein the chain retainer is slidably adjustable relative to the bracket.

31. The guard according to claim 1, wherein the second end of the bracket extension is molded as a single piece.

32. The guard according to claim 13, wherein the second end of the bracket extension is molded as a single piece.

33. The guard according to claim 26, wherein the bracket extension is molded as a single piece.

* * * * *